(12) United States Patent
Stewart et al.

(10) Patent No.: US 12,091,965 B2
(45) Date of Patent: Sep. 17, 2024

(54) TAPE WINCH, DRILLING PROGRESS MEASUREMENT AND HOLE DEPTH MEASUREMENT

(71) Applicant: GLOBALTECH CORPORATION PTY LTD, Forrestfield (AU)

(72) Inventors: Gordon Stewart, Forrestfield (AU); Raymond Hill, Forrestfield (AU)

(73) Assignee: Globaltech Corporation Pty Ltd, Forestfield (AU)

( * ) Notice: Subject to any disclaimer, the term of this patent is extended or adjusted under 35 U.S.C. 154(b) by 0 days.

(21) Appl. No.: 17/434,679

(22) PCT Filed: Feb. 27, 2020

(86) PCT No.: PCT/AU2020/050181
§ 371 (c)(1),
(2) Date: Aug. 27, 2021

(87) PCT Pub. No.: WO2020/172719
PCT Pub. Date: Sep. 3, 2020

(65) Prior Publication Data
US 2022/0042412 A1    Feb. 10, 2022

(30) Foreign Application Priority Data

Feb. 27, 2019    (AU) ................. 2019900616

(51) Int. Cl.
*E21B 47/09*    (2012.01)
*E21B 19/02*    (2006.01)
(Continued)

(52) U.S. Cl.
CPC .............. *E21B 47/09* (2013.01); *E21B 19/02* (2013.01); *E21B 33/08* (2013.01); *E21B 45/00* (2013.01);
(Continued)

(58) Field of Classification Search
CPC ........ E21B 19/008; E21B 19/02; E21B 45/00; E21B 47/09; E21B 47/04; G01B 7/04;
(Continued)

(56) References Cited

U.S. PATENT DOCUMENTS 1,969,969 A * 8/1934 Dunagin ................. E21B 47/04
33/749
2,623,805 A * 12/1952 Sewell .................... E21B 47/26
331/181
(Continued)

FOREIGN PATENT DOCUMENTS

AT            400872 B  *  2/1996
CN         102910295 A  *  2/2013
(Continued)

OTHER PUBLICATIONS

"Apparatus for raising and lowering a body in chimney shafts", 1989, English Translation from Google Patents, 10 pages (Year: 1989).*

*Primary Examiner* — Jennifer H Gay
(74) *Attorney, Agent, or Firm* — Charles H. Jew

(57) ABSTRACT

Winch (304) has a load bearing tape (305) to advance into a borehole (307). Hole depth can be determined by subtracting a sensed height (310) above ground surface (311) from total depth (312) measured. Can include a height above ground sensor (314) and a tape distance measurer (316). Depth of water or watery mud or muddy water (320) can be sensed, such as by a pressure sensor (326) on a weight or in a sensor device at or near the tape leading end. A heater (309) can warm the tape. A cover or housing (313) can be provided for the winch or spool. The tape can include wires or fibre optics (336) embedded in or applied to a surface of the tape (305) and/or apertures or embedded or surface (Continued)

applied markers/indicators (338) along a length thereof e.g. for reading by an optical or magnetic sensor.

28 Claims, 7 Drawing Sheets

(51) Int. Cl.
    *E21B 33/08*     (2006.01)
    *E21B 45/00*     (2006.01)
    *G01B 7/04*     (2006.01)
    *G01B 7/26*     (2006.01)
    *G01B 11/04*     (2006.01)
    *G01C 9/00*     (2006.01)

(52) U.S. Cl.
    CPC ............... *G01B 7/04* (2013.01); *G01B 7/26* (2013.01); *G01B 11/043* (2013.01); *G01C 9/00* (2013.01)

(58) Field of Classification Search
    CPC ......... G01B 7/26; G01B 11/043; G01C 9/00; B65H 2701/37; B66D 1/60
    See application file for complete search history.

(56) References Cited

U.S. PATENT DOCUMENTS

| | | | | |
|---|---|---|---|---|
| 3,107,431 | A * | 10/1963 | Matchett | E21B 47/04 33/734 |
| 3,978,588 | A * | 9/1976 | Richardson | E21B 47/092 33/701 |
| 4,099,410 | A * | 7/1978 | Martin | E21B 45/00 73/152.45 |
| 4,334,217 | A * | 6/1982 | Nield | B66B 1/3492 175/45 |
| 4,389,885 | A * | 6/1983 | Martin | E21B 45/00 73/152.44 |
| 4,570,348 | A * | 2/1986 | Amsler | G01B 7/046 33/734 |
| 4,623,100 | A * | 11/1986 | Tremblay | B65H 54/2884 242/478.2 |
| 4,736,297 | A * | 4/1988 | LeJeune | G01P 3/50 702/9 |
| 4,787,244 | A * | 11/1988 | Mikolajczyk | E21B 45/00 73/152.01 |
| 4,898,336 | A * | 2/1990 | Reist | B65H 29/006 242/540 |
| 5,097,901 | A * | 3/1992 | Klaeger | E21B 19/22 254/270 |
| 5,159,499 | A * | 10/1992 | Goodman | G01D 5/14 346/33 WL |
| 5,206,065 | A * | 4/1993 | Rippingale | G01V 3/15 428/592 |
| 5,469,916 | A * | 11/1995 | Sas-Jaworsky | E21B 47/092 138/104 |
| 5,546,672 | A * | 8/1996 | Campbell | G01P 3/50 33/735 |
| 6,563,303 | B1 * | 5/2003 | Watkins | E21B 17/20 324/206 |
| 7,201,365 | B2 * | 4/2007 | Crawford | B66C 13/14 254/284 |
| 8,548,742 | B2 * | 10/2013 | Pugh | G01P 3/806 702/6 |
| 8,680,456 | B2 * | 3/2014 | Pugh | E21B 47/04 250/221 |
| 2007/0044991 | A1 * | 3/2007 | Varkey | H01B 7/2806 174/102 R |
| 2007/0221386 | A1 * | 9/2007 | Rock | E21B 33/072 166/380 |
| 2009/0219171 | A1 | 9/2009 | Vigneaux | |
| 2010/0097450 | A1 * | 4/2010 | Pugh | G01P 3/806 348/222.1 |
| 2015/0158692 | A1 * | 6/2015 | Reynolds | B65H 75/425 414/547 |
| 2015/0226050 | A1 * | 8/2015 | Bartel | E21B 47/18 700/275 |
| 2016/0230532 | A1 * | 8/2016 | Kasperski | G06K 7/10881 |
| 2017/0110866 | A1 * | 4/2017 | Kalaba | A63J 1/028 |
| 2017/0306749 | A1 | 10/2017 | Van Der Ende | |
| 2022/0042412 | A1 * | 2/2022 | Stewart | E21B 47/04 |
| 2022/0293298 | A1 * | 9/2022 | Chevillard | H01B 7/046 |

FOREIGN PATENT DOCUMENTS

| | | | | |
|---|---|---|---|---|
| CN | 211974944 | U * | 11/2020 | ............ B66D 1/12 |
| CN | 116745230 | A * | 9/2023 | ......... B65H 75/4442 |
| DE | 4004939 | A1 * | 8/1991 | ............ G01F 23/14 |
| GB | 507675 | A * | 1/1938 | ............ F21V 21/38 |
| GB | 1362513 | A * | 8/1974 | ............ B32B 5/02 |
| WO | WO-2022152892 | A1 * | 7/2022 | ............ B65G 1/04 |

* cited by examiner

TAPE WINCH, DRILLING PROGRESS MEASUREMENT AND HOLE DEPTH MEASUREMENT

FIELD OF THE INVENTION

The present invention relates to a device and/or methodology for deploying from a spool and/or retrieving onto a spool a tape as a flexible elongate member.

One or more forms of the present invention relates to measuring or determining rate of advancement of a drill, such as penetration during a drilling operation.

One or more forms of the present invention relates to monitoring, sensing and/or measuring rate of penetration, particularly during onshore hard rock drilling operations.

The present invention finds application as a method for monitoring, sensing and/or measuring a rate of penetration of a drilling assembly while drilling and/or a device/system for monitoring, sensing and/or measuring a rate of penetration according to the respective method.

One or more forms of the present invention relates to winches. Accordingly, in such one or more forms, the present invention finds particular application in relation to improvements to load bearing members for winches.

One or more forms of the present invention find(s) application in means and methodology for monitoring or determining payout distance of winch flexible elongate suspension member or a load bearing member of a winch.

The present invention finds particular application in relation to drilling or borehole survey or core sampling operations.

One or more forms of the present invention relates to monitoring, sensing and/or measuring depth of a drill hole or blast hole and/or depth of a liquid in such a drill hole or blast hole.

BACKGROUND TO THE INVENTION

Spooled elongate members are known. Tape measures and movie film both include a flexible elongate member that deploys from a spiral wound state around a central spool to an unwound extended state. Retraction, such as in the case of a tape measure, can be powered.

Winches are known to be used for many lifting and lowering applications. For example, electrically or hydraulically powered winches using a steel cable to raise or lower loads have been used on worksites for many years.

Most powered winches use a round section steel cable as the load bearing member to pay out and retrieve from a winch drum. The round section cable does not readily overlay one winding onto another on the winch drum.

Winches that use round section cable take up a great deal of space on a drill rig. Round section cable does not overlay well one cable wind onto another around the winch drum. The cable winding can become overlapped or need a guide mechanism to guide the cable windings side to side in order to form even layers of the round section cable onto the drum.

A spooling guide mechanism is used to ensure that the cable winds on or off the drum in a side to side action to ensure that the cable does not become overlapped and twisted or tangled on itself, to ensure reliable paying out and retrieval of the cable and otherwise avoid damage the cable.

The spooling guide mechanism gradually shuttles the cable or rope side to side during winding in and winding out to ensure that the cable or rope does not wear, tangle or wrongly overlap on the spool and to ensure even layering of the cable or rope coils.

Such a spooling guide mechanism adds to cost, complexity and weight of the winch, and is needed because of the round section cable or rope.

A flat, ribbon like cable has been proposed for use with winches. For example, patent publication GB 1362513 discusses a ribbon like cable formed of a laminate structure of layers of individual longitudinally orientated filaments all encased within a plastics matrix.

GB 507675 also discloses a winch having a tape as a load bearing member, and the winch mechanism having an automatic stop device.

Knowing or monitoring the distance that a load has been deployed supported by the load bearing member can be very important in certain applications. For example, when deploying a survey tool or core sample orientation tool downhole, knowing or being able to monitor distance deployed and therefore how deep is the borehole or how close to the landing for the tool or how close to the drill bit or bottom of the hole is the tool the more efficient and reliable drilling survey and core sampling practice become.

A rotary encoder can be used with some winches to monitor drum rotations and therefore predict the overall length of cable that has been payed out. However, such encoders or the control system using the encoder has to be aware of the change in circumference of the windings on the drum as the cable is payed out or wound back in.

Furthermore, having round section cable creates high electrical or hydraulic loads on the winch, requiring a higher rated electrical motor or hydraulic drive than might otherwise be required.

On drill rigs, space is at a premium. The fewer items of equipment and the smaller those items of equipment the better. Standard winches using round section cable take up more space than would be preferred.

Typically, the depth of a drilling assembly in the borehole is determined by measuring the length of pipe entered into the borehole from the surface. The depth may be corrected for the effects of drill string tension or compression, such as due to the length of the drillstring and ambient temperature.

As such, the total length of the borehole can readily be determined from the total length of the number of known lengths of drill tubes (usually in 3 m or 6 m lengths) added to the backend of the drilling assembly incorporating the drill bit or other downhole tool. The vertical depth of the borehole can be determined from the length of the drillstring, inclination and azimuth of the borehole.

Such absolute depth and vertical depth of the borehole and the length of the drillstring are useful data. However, to measure productivity and progress of the borehole, and to predict when a preferred depth might be reached, the rate of penetration (ROP) of the drill bit into the underlying rock is a valuable measure.

Such ROP measurement for a drilling operation is typically calculated manually. For example, as a function of depth drilled over time. A simple calculation of the length of drillstring at the surface progressing downwards over time is used to determine the ROP.

One known system for measuring rate of drill penetration for a drilling operation is disclosed in US patent document U.S. Pat. No. 3,853,004, which describes use of a measuring system having rotary transducer to measure the distance a draw cable advances during a drilling operation. The transducer has a wheel which rests against the draw cable. As the drill advances, the draw cable also advances. This causes the rotary transducer wheel in contact with the cable to rotate and provide an angular measurement equating to distance.

Rate of penetration can be calculated based on the measured time taken for the wheel to rotate a given number of degrees.

Measuring or monitoring drill bit wear in hard-rock drills (particularly diamond-tipped drill bits) is important so that drill operators know more accurately and reliably when the expensive and time consuming operation of removing the drillstring from the borehole and changing a (diamond-tipped) drill bit needs to be carried out.

Furthermore, comparing drill bit penetration rate to records/logs of previously drilled holes can confirm if a reduction in penetration is due to geological formation or the stratified nature of the borehole.

Also, knowing the ROP or change in ROP over time helps to determine whether to adjust weight-on-bit (WOB) to control drill bit wear and potentially prevent failure of the drill bit, until a suitable drill bit change-out time.

Whilst a general feel for rate of penetration is often obtained in a drilling operation by dividing the total length of the drill rods by the time taken during the day to drill that length, such a measure is an overall average ROP, does not give any detail of variance in ROP during the drilling operation shift(s) or due to different operators working the drill, or different rock strata.

It has optionally been found desirable to improve determination of rate of penetration for a drilling assembly that alleviates or overcomes at least one of the aforementioned problems.

It has further optionally been found desirable to be able to provide an objective assessment of drilling performance for one or more drilling operations.

It has further optionally been found desirable to obtain real time rate of penetration data, which can be used to optimise drilling performance and reduce premature wear of drill bits.

It has yet further optionally been found desirable to provide a winch device that can be used to pay out and retract a load bearing member with reduced likelihood of tangling or wear of the load bearing member and without needing a spooling guide to spool the load bearing member side to side for deployment from, or storage on, the spool.

Current procedure to measure the depth of drill and blast holes is to attach a weight, typically a rock or 'plumb bob', to an end of a measuring tape and lower it into a blast hole. When the weight with the tape end attached reaches the bottom, the depth of the hole can be read from the measuring tape and recorded in a note book. At the same time, it would be useful to be able to establish how much water is in the drill or blast hole, as well as the verticality of the hole. Such methodology and equipment for determining drill or blast hole depth, and optionally the depth of water, in such a hole are basic and risk operator inaccuracy.

One known device developed to determine the depth of a drill or blast hole includes a small, portable battery powered chord winch with a weight attached to a free end of the chord. A digital handheld device commands the winch to pay out or retrieve the weight, and the length of chord payed out is measured and shown on the handheld. The chord extends through a flexible leader tube attached to the winch, and the end of the leader tube is used as a marker for the surface opening zero height of the drill or blast hole.

A problem with chords (such as cables) is that they are generally circular in cross section, and tend to stretch, allow the weight to spin, or both, resulting in inaccuracy in the depth measurement.

Another problem exists in that a tool lowered downhole on a cable may be slowed by contact with water or watery liquid down the hole. The cable can continue to pay-out and go beyond the tool into the water/watery liquid without the operator realising that the tool has slowed. Distance measurement into the hole can therefore be incorrectly measured at the surface based on the amount of cable payed-out.

It is with one or more of the aforementioned issues in mind that the present invention has been developed.

SUMMARY OF THE INVENTION

An aspect of the present invention provides a drilling rate of penetration measurement system for a drilling operation, the system including a sensor device to provide an indication of distance a drill bit or part of a drill rig or other tool advances during drilling, the sensor including a device having a flat tape that unwinds from being spirally wound around a narrow spool to an extended orientation during such advancement, and rewinds into a spiral of the tape during a return action.

A further aspect of the present invention provides a method of optimising drilling performance of a drilling system, the method including determining rate of penetration of the drill during a drilling operation by obtaining from a sensor device having a tape that deploys from a single spiral to provide an indication of a distance advanced by the drill bit during a period of drilling, calculating rate of penetration of the drill bit over the distance during a period of time, and controlling at least one drilling parameter based on at least the drilling rate of penetration.

Another aspect of the present invention provides a method of controlling drilling performance of a drilling system, the method including determining rate of penetration of the drill during drilling by measuring deployment of a tape from a single spiral wound around a spool, and controlling based on such measurement at least one of weight on bit (WOB), flow of drilling fluid, torque applied to the drill bit and revolutions per minute (RPM) of the drill bit.

The ROP value(s) may be used to influence control of at least one of weight on bit (WOB), flow of drilling fluid, torque applied to the drill bit and revolutions per minute (RPM) of the drill bit. Thus, a feedback can be provided such that measured or calculated ROP is used as a parameter/input in calculating a required WOB, torque, RPM or fluid flow circulated to/from the drill bit to modify or control drill bit wear or drill penetration rate.

Preferably the system, device or method includes a timer or clock providing an indication of an elapsed time during which the drill bit or other tool advanced a distance.

Preferably, length of the tape deployed over a measured period of time may be used to determine rate of advancement of the drill during the drilling operation A measure of rate of penetration of the drill bit or other tool into the borehole is calculated by dividing or differentiating the distance with respect to time to give a velocity (rate of penetration).

Preferably, the rate of penetration may be sensed, measured or monitored automatically, such as the sensor communicating with a central computer/processor.

A user interface may be provided to monitor and/or manage such automatic control.

One or more embodiments of the present invention may include at least one threshold detector. For example, to warn operators when optimisation parameters have dropped below the preferred state to inform that a bit needs to be changed.

Thus, one or more embodiments of the present invention may preferably include monitoring one or more drilling parameters, such as RPM, WOB, flow of drilling fluid, torque etc., and providing a warning or alert to an operator and/or initiating slowing or stopping of drilling when a drilling parameter meets or exceeds a threshold. For example, if rate of penetration cannot be increased because of a worn drill bit, or if torque would exceed a maximum permitted, or weight on bit would or may exceed a maximum permitted or may cause damage to the drill bit, the alert or warning allows the operator to cease or modify drilling, or drilling may automatically be modified to compensate or alleviate the sensed parameter. WOB may be reduced, torque may be reduced, rate of penetration may be reduced, applied RPM may be reduced, or drilling stopped.

It will be appreciated that one or more forms of the present invention advantageously provides a reliable and robust sensor device or system that can be used to determine the magnitude of the linear movement of a drill bit, part of a drill rig that advances during drilling, or other downhole tool into the earth, and preferably relative to time. This provides a sensor arrangement that accurately measures rate of penetration.

Preferably, the rate of penetration (ROP) sensor device or system interfaces with other sensing equipment. For example, the device may be configured to interface with other sensors or sensor arrangements/devices, such as force, torque, pressure, vibration, temperature, and (mud) flow, to assist in tracking wear and tear on the drill bit and predict drill bit changeover times.

The ROP sensor device or system provides means to measure, and either display and record, or communicate measurements for remote display and recordal, for the rate of drill bit penetration during a drilling process by measuring angular rotation, such as of the drill string or top drive.

Preferably the sensor device or system may be mounted to a drilling assembly, such as a drilling mast.

More preferably, the sensor device or system may be mounted to the drilling assembly via one or more resilient mounts to reduce or prevent unwanted vibration from drilling affecting the quality of signal produced by the sensor.

Preferably the one or more resilient mounts may include rubber, urethane or other vibration damping materials.

The sensor device or system may be fixedly mounted to the drilling mast or column and a free end of the tape may be connected to a moveable portion of a drillstring drive assembly. Consequently, as the drill string drive assembly advances as the drill bit bores into the rock at the bottom of the borehole, the tape pays out.

Angular measurement of a spool about which the tape is wound prior to deployment may be obtained by use of a rotary or shaft encoder, such as an optical disc or shaft encoder.

The encoder may be operated by the tape paying out as the drill advances, with the spool rotatably connected to the drill rig (such as the drilling mast) so that the tape extends from the spool and thereby causes rotation of an encoder component to produce values equating to distance the tape has extended.

The spool may be connected to a shaft in the sensor device, which shaft rotationally drives an encoder disc, such that, as the tape pays out, the rotary encoder disc rotates and provides an angular measure of the length of extent of the tape, this correlating with the distance the drill drive has advanced, and therefore a measure of the distance the drill bit has advanced.

Preferably angular measurement from the encoder or measured length of deployment of the tape combined with the time taken for an associated penetrating movement is displayed as the rate of penetration of the bit (distance divided by time). Also, change of rate of penetration can be determined i.e. acceleration (advancing into the borehole) or deceleration (retraction from the borehole.

The sensor device or system may communicate wirelessly from the drill mast to a remote measurement processing and data storage location. Thus, the sensor may communicate angular position values to a processor which creates a measure of distance from the angular measurements.

Incorporating GPS time of day and/or computer processing ensure(s) that the ROP measurement is recorded accurately and reliably.

It will be appreciated that one or more embodiments of the method, device or system of the present invention may incorporate wireless technology to wirelessly transmit ROP data from the drill rig to a remote data receiver/processor.

As an example, the sensor device or system providing a measure of penetration of the drill bit may be arranged and configured to provide such distance data to a remote computer or logging device/system. Such a wireless arrangement enables retro integration of the device/system of the present invention with old or new drill rigs.

In relation to onshore mineral exploration drill rigs, current technology for measuring ROP is unreliable due to vibration and exposure to the weather.

A particular benefit of at least one embodiment of the present invention is that the device or system may be protected against ingress of moisture and dirt by a wiper arrangement to wipe the tape as it retracts.

The spool and spirally wound tape can be housed within a housing to protect the tape. Preferably the tape extends through a slot in the housing. The slot may include the wiper arrangement mounted thereto or adjacent thereto.

At least one embodiment of the present invention may also or alternatively include a resilient mounting system to advantageously prevent vibrations from drilling operations causing errors in the ROP measurement data.

Geological models and data from previously drilled holes may be combined with drilling data obtained for comparison with drilling data obtained for a borehole being drilled to help determine drilling performance indicators for that borehole, such as a drill bit wearing too much, too quickly or to indicate when a bit needs to be changed. Such data can be displayed on a display screen associated with the device/system.

Drilling data, including the ROP measurements, may be handled and/or communicated using a common protocol shared by a number of devices/systems of the drill rig. For example, a device or system according to an embodiment of the present invention may communicate rate of penetration data to a sub, such as to a wireless sub, and/or other peripherals handling drilling related data associated with that drill rig.

Preferably, real time ROP information may be displayed on a display screen, such as by a 'dashboard' style software application. For example, ROP in millimetres per second (mm/s), millimetres per minute (mm/min) or metres per minute (m/min) may be displayed.

One or more embodiments of the present invention may sense the distance advanced (amount of penetration, say, in mm) by the drill bit over a known or calculated period of time, and this may be displayed as ROP.

Time rate of change of ROP may also be calculated to determine sudden acceleration or deceleration of the drill bit (such as suddenly penetrating a void or softer rock/sand).

Status information may also be displayed. Status information may shown whether ROP has increased or decreased over time. Also torque on bit, weight on bit, RPM and/or drilling fluid pressure/flow rate may be displayed.

Detection of one or more thresholds may be provided. For example, one or more detectors to provide an indication or warning to be displayed to an operator. Action can then be taken to modify drilling activities, such as reducing WOB, slowing down RPM, increasing drilling fluid flow.

It will be appreciated that it is highly advantageous to rock drill operators to be able to measure wear and tear of deep-bore (diamond) hard rock drills so that drilling operators know more accurately and reliably when the expensive operation of changing a drill bit needs to be carried out.

For example, on average, a diamond-tipped drill may penetrate through 30 metres of hard rock per 12-hour shift, at an average of 2.5 m an hour.

Changing a drill bit, even at shallow borehole depths of only a few hundred metres, can take two hours to complete. This equates to 5 m of lost drilling productivity, increased operating costs in personnel time and running/site costs, and valuable production time. A bit that is worn out too early is financially costly to correct, depending on the materials used and this cost could occur several times in a week until drill operators pick up the field incident via their daily drilling reports.

Comparing drill bit penetration rate (ROP) to logs of previously drilled holes can help to confirm if a drop in the penetration rate is due to geological formation or the stratified nature of the borehole. Utilising at least one embodiment of the present invention, this rate of penetration and geological comparison can be calculated automatically via a central computer in a user interface.

Threshold detectors can warn operators when optimisation parameters have dropped, to inform the driller that a bit needs to be changed.

During diamond core drilling, a bore hole is drilled into the earth by the drill rig by driving a rotating hollow shaft with a diamond impregnated bit attached at the bottom of the drill string. As the bore hole is drilled deeper into the earth, the drill string is lengthened by adding rods at the surface.

The ROP device/system of the present invention measures the rate of penetration of the drill bit as the rock is eroded by the cutting action of the diamond bit. During this operation, the drill fluid flows down the hollow drill stem through the bit and is forced back to the surface carrying the drill cuttings to the surface as well as providing lubrication and cooling of the bit.

"The physical condition of a drilling bit, the rate of rotation, the weight applied to the bit and the viscosity of the drilling fluid and the rate of fluid around the flow loop are important measurements. During drilling, the only variable that cannot be detected directly is the physical condition of the bit.

The capacity and capability to measure drill bit condition can be provided by applying constant weight on bit (WOB) and rate of rotation (RPM) then monitor penetration rate of the borehole as rock is diminished and the hole progresses. Decreasing penetration rates can be a sign of a deteriorating bit.

In most drilling scenarios, rate of penetration measurement is a manual calculation usually determined as a function of time over a certain depth of penetration. Such manual calculation introduces risk of user error.

However, due to the accuracy of the present invention very small increments of depth penetration can be determined over fixed time intervals to determine the depth of cut.

The user interface can provide clear digital readouts for an operator and a charted history feature for real time and post drilling analysis.

Operators will be able to assess and compare the performance of their drillers across their entire fleet of drill rigs. The data will be sent remotely to a base as a monitor for daily performance.

An important benefit of the device or system of the present invention is its immunity to erroneous measurements caused by the vibration during the drilling process.

One aspect of the present invention provides a winch including a load bearing member in the form of a flexible elongate tape, and a spool onto which the load bearing member is wound in and from which the load bearing member is payed out, the load bearing member being wound onto itself in a single spiral on the spool.

Preferably the tape is flat in cross section.

More preferably the tape may have a curve in cross section when deployed. This curvature can provide rigidity to the payed out portion of the tape and can help to prevent stabilise the tape.

The tape may be substantially thinner in cross section than its width. The tape may have a thickness between flat surfaces thereof (e.g. when stored on the spool) of 10% or less than the width of the tape, preferably 5% or less, more preferably 3% or less. The tape may be a thin tape relative to its width, and may have a thickness of 5 mm or less, preferably 3 mm or less, more preferably 1 mm or less, and yet more preferably 0.5 mm or less.

The tape may have a structure of strands orientated in multi directions, such as a combination of longitudinal, transverse or diagonal strands, filaments or ribbons of material.

The strands, filaments or ribbons, or combinations of two or more thereof, may be bonded or fused together.

The strands, filaments or ribbons may be bonded in a plastics or resin material, bonded in an adhesive material or may be heat sealed together, or combinations of two or more thereof.

The tape may include or be formed of metal strands or wires, or may be a metal tape.

The tape may include a number of indicators or markers disposed along at least part of its length.

The indicators or markers may be spaced at regular intervals between each one thereof.

The indicators or markers may be applied onto or into the material of the tape.

Alternatively, the indicators or markers may include holes through the tape or thinning of the tape.

The tape may include metallic or electrically conductive indicators within, embedded in and/or applied to the tape.

Alternatively, the indicators may be provided within the material of the tape. For example, the indicators or markers may be of a material to provide a signal by inductive sensing.

The indicators or markers may be of metal embedded in the material of the tape.

The indicators or markers may be embossed or part of a patterning of the tape.

An indicator or marker sensing apparatus may be provided.

The indicator or marker sensing apparatus may include an electromagnetic device for sensing the presence of each said indicator at a particular position as the tape is payed out and/or wound in.

A further aspect of the present invention provides a sensing system for monitoring distance a load bearing member of a winch is payed out or wound in, the sensing system including means for sensing presence and/or position of spaced indicators provided on a tape type load bearing member.

Preferably the sensing system includes magnetic or electromagnetic sensing of the indicators.

Electromagnetic sensing may include optical sensing.

Preferably the material of the load bearing member is opaque or semi-opaque to optical light or to electromagnetic radiation or is not significantly influencing of a magnetic filed.

The sensing system may include illuminating the tape with electromagnetic radiation, which may pass through the tape at the indicators but not through material of a body of the tape.

Preferably the tape includes one or more holes through which the electromagnetic radiation can pass.

The electromagnetic radiation passing through the tape at each consecutive indicator may be detected by a detector of the sensing system.

The tape may be attached to the spool via a connection arrangement. The connection arrangement may include a portion of the tape being retained by a labyrinthine pathway provided on the spool.

Alternatively or in addition, the tape may be retained by a clamping mechanism.

An advantage of one or more embodiments of the present invention is that the tape deployment and/or retraction device or system may draw low current from an electrical supply relative to traditional spooling winches where the round section heavy gauge (and weight) steel cable has to spool horizontally side to side to overlay one cable layer onto another, whereas the one or more embodiments of the present invention can utilise a relatively lightweight yet tensile strong flat tape that spools directly as a spiral wound continuous layer.

In addition, at least one embodiment of the present invention is sufficiently lightweight, due to the use of a relatively lightweight, thin yet strong tape as the elongate hoisting member and resultant use of less weighty spool, bearings and motor traditionally used, that the winch can be packed and transported in a portable case.

It will be appreciated that there are many applications for the winch, such as in the construction industry, mineral exploration, defence, extreme sports, emergency services/rescue or as an arrestor system.

Preferably the device may be powered by a 12V and 24V DC motor, which may be powered via a battery and may draw only up to about 30 Amps.

It will be appreciated that spooling of the tape in a continuous spiral on itself means that a side-to-side level wind or spooling mechanism is not required as sideways movement of the tape is prevented by the sides of the relatively narrow spool. This reduces mechanical complexity, weight and cost compared with, for example, traditional cable winches with spool guide mechanisms.

The diameter of the spooled tape is at minimum diameter on the spool when unwound and results in maximum pull force for a given input shaft torque in this state when rewinding the tape, which is an advantage for the present invention.

The relatively narrow spool (such as in the style used for movie film) utilised in one or more embodiments of the present invention does not have significant axial stress as it does not have a round section elongate load member bunched together combined with tension from a hoop load.

The spool axial length/width is preferably only sufficiently wide to spool a load member in a single spiral on itself, which maintains the spool with a narrow profile taking up minimal lateral space. Hence the spool can have a narrow profile compared to that of a conventional winch needing a wide spool for a horizontally a wound load member.

It will be appreciated that birds-nests' from over-run of the tape type load member cannot easily occur, resulting in less operational downtime and thereby higher efficiency.

Due to the lower loads a lighter weight design/construction may be used for the winch. Common, high strength, non-conventional load bearing tapes can be adopted for use with one or more embodiments of the tape winch.

Preferably, the tape to be used as the load bearing member may have spaced markings along its length suitable to be detected for measurement using contactless technology.

Due to the low weight possible the winch may be manually handled and portable, rather than being a fixed unit on a drill rig mast head. This eliminates one more fall hazard for the operators Preferably, the load bearing tape may include strapping tape, such as used for securing boxes and loads and for packaging.

Preferably the load bearing tape may be a plastic strapping tape.

A further aspect of the present invention provides a tape for use as a load bearing member of a winch, the tape including spaced indicators deployed along a length of the tape, the indicators for use in detecting distance deployed and/or rate of deployment of the tape.

The tape may include spaced indicators bonded onto or into material of the tape, or are marked onto the tape.

The spaced indicators may be formed of the material of the tape or by transparency or thinning of the tape.

The indicators may be metallic or electrically conductive indicators within, embedded in and/or applied to the tape.

The indicators may be of a material to provide a signal by inductive sensing.

The tape may be at least partially opaque to optical light or to electromagnetic radiation or is not significantly influencing of a magnetic filed.

The tape may include strands or filaments.

A further aspect of the present invention provides a tape winch device including a mechanism that pays out a tape and reads markers provided in, through or on the tape using an optical or magnetic reader.

Preferably the device includes a weight attached to a leading (free) end of the tape. Preferably a pressure sensor is provided at or adjacent the weight or the leading end of the tape.

Length of the weight can be compensated for in relation to the length of tape payed out by the device. For example, the weight may otherwise add to the length of the tape, and would give a false depth reading if not compensated for either in the depth calculation by the device or by the optical or magnetic reader.

The weight may preferably be or include a stainless steel 'bob' to be used with the device to measure hole depth, measure the water table height and/or the water depth.

The device may include a verticality sensor to measure angle of the hole, such as with respect to vertical.

Drill hole or blast hole depth and/or water depth measurements do not need to be calibrated because such depth is recorded directly from the winch tape optical or magnetic reader.

Depth data can be recorded to USB or sent wirelessly to a progress report. A chart showing hole depth, verticality and water table can be charted Due to the light weight nature of the flat tape, the device can be used as a handheld or suspended from a strap, belt or harness on a user.

Preferably, the weight will drop down the hole and pull the tape to the bottom of the hole due to gravity acting on the weight. That is, the tape can freely pay out without a powered winch paying out the tape.

Alternatively, the device may include a powered paying out winch and the weight guides the tape downwards as the winch pays out the tape under power.

The device may include a sensor that senses slack in the tape or reduction in weight acting on the tape and therefore on the device, and the tape is stopped.

A reading may then be taken of distance the tape has been payed out based on the readings from the optical or magnetic measurement device.

One handed operation of the device is possible with the user wearing gloves.

Preferably, the device includes a height sensor to determine the height of the device from ground surface.

The device may include means to subtract the determined height from the ground surface from the length of tape payed out so the true hole depth measurement can be recorded. This will save an operator from having to bend down to mark the top of a hole on the tape manually so that actual hole depth can be calculated.

The weight and/or the device and/or the tape may include at least one pressure sensor and/or at least one temperature sensor.

Furthermore, the weight, the tape and/or the device may include a moisture sensor and/or immersion sensor to sense when the tape/weight enters water downhole.

A sensor device may be provided attached to or forming part of the tape, such as toward or at the leading (free) end of the tape.

The sensor device may incorporate one or more of depth and/or pressure and/or temperature sensors. The sensor device may include on-board power supply, such as a battery.

The sensor device may be electrically connected to the surface, such as by one or more wires extending within or on the tape.

The sensor device may communicate data to and/or from the surface by one or more electrical or optical connections. For example, electrical wires and/or optical fibres may connect between the sensor device and the surface, such as to the winch device or to a data communication device on or associated with the winch device.

In use, a method of obtaining downhole data may involve starting the sensor device sensing, such as via the handheld winch, and the sensor device begins logging data or delays logging data until a threshold is met, such as measuring a predetermined pressure, sensing immersion in water or a predetermined temperature.

The sensor device is lowered into the drill or blast hole with the weight. It will be appreciated that the winch device may be used in applications not requiring a drill or blast hole, such as anywhere that a depth or distance downwards is required e.g. from a building, into a mine shaft or natural sink, over a cliff.

When the bottom of the hole or other depth is reached, hole depth or accelerometer measuring that tape is not moving triggers a recording or sensing event.

After recording depth and any other desired parameter is achieved, the winch pulls up the sensor device and any associated weight (the sensor device may include or be the weight).

At the surface, the depth and any other recorded data (pressure, temperature etc.) is retrieved from the sensor device and can be compared with the depth/distance from the optical/magnetic sensor for the tape at the winch device at the surface.

Alternatively, wires or fibre optics may be embedded in or provided on the tape.

Data from downhole can be collected 'in real time' or recorded while the sensor device is in the hole.

The data obtained can be analysed at a later time.

A further aspect of the present invention includes a winch apparatus including a load bearing member in the form of a flexible elongate tape, and a spool onto which the load bearing member is wound in and from which the load bearing member is payed out, the load bearing member including a tape.

The tape may be flat or curved in cross section. The tape may have a structure of strands orientated in multi directions. The multi directions may include a combination of two or more of longitudinal strands, transverse strands, diagonal strands, filaments or ribbons of material. The longitudinal strands, transverse strands, diagonal strands, filaments or ribbons, or combinations of two or more thereof, may be bonded or fused together. The longitudinal strands, transverse strands, diagonal strands, filaments or ribbons may be bonded in a plastics material, bonded in an adhesive material or heat sealed together, or combinations of two or more thereof.

The tape may include metal strands or wires. The tape may be a metal tape. The tape may include a number of indicators or markers disposed at spaced intervals along at least part of its length. The indicators or markers may be applied onto or into the material of the tape or are provided by holes or recesses in the tape, or by transparency or thinning of the tape. The spaced indicators or markers may include metallic or electrically conductive indicators within, embedded in and/or applied to the tape. The spaced indicators or markers may include a material providing a signal by inductive sensing.

The winch apparatus may include a sensing system for monitoring length or distance the load bearing member of the winch is payed out or wound in.

The sensing system may include means for sensing presence and/or position of the spaced indicators provided on the load bearing member.

The winch apparatus may include magnetic or electromagnetic sensing of the spaced indicators.

The load bearing member may be opaque or semi-opaque to optical light or to electromagnetic radiation or is not significantly influencing of a magnetic field.

The winch apparatus may include means to illuminate the tape with electromagnetic radiation.

Preferably the tape includes one or more holes through which the electromagnetic radiation passes.

The winch apparatus may include at least one pressure sensor at or adjacent a weight or the leading end of the tape. Preferably the weight includes a stainless steel member, such as a 'bob'.

The winch apparatus may include a verticality sensor to measure angle of the hole into which the load bearing member is advanced.

The winch apparatus may be provided as a handheld device or provided as a strap, belt or harness suspended device for support by a user.

The winch apparatus may include at least one sensor that senses slack in the tape or reduction in weight acting on the tape and therefore on the device.

When the sensor senses the slack in the tape or the reduction in weight acting on the tape, the winch may be stopped.

The winch apparatus may include at least one height sensor to determine the height of the winch device from ground surface.

The winch apparatus may include a processor means to subtract the determined height from the ground surface from the length of tape payed out so the true hole depth measurement can be recorded.

The winch apparatus may further include a timer or clock providing an indication of an elapsed time during which the tape advances during paying out from the spool.

Length of the tape deployed over a measured period of time may be used to determine rate of advancement of the tape.

A leading or free end of the tape may be connected to a moveable portion of a drillstring drive assembly associated with the drilling mast.

The winch apparatus may include a wiper arrangement to wipe the surface of the tape.

The spool and spirally wound tape may be housed within a housing.

The tape may include metallic or electrically conductive indicators within, embedded in and/or applied to the tape.

The tape may include spaced indicators or markers deployed along a length of the tape, the indicators for use in detecting distance deployed and/or rate of deployment of the tape.

The spaced indicators or markers may be bonded onto or into material of the tape, or are marked onto the tape.

The spaced indicators or markers may be formed of the material of the tape or by transparency or thinning of the tape.

The spaced indicators may include metallic or electrically conductive indicators or markers within, embedded in and/or applied to the tape.

The spaced indicators or markers may be of a material to provide a signal by inductive sensing.

The winch apparatus may include a mechanism that pays out a tape and reads markers provided in, through or on the tape using an optical or magnetic reader.

The tape having a width greater than its thickness reduces the possibility of the tape looping past the tool when the tool is slowed during its descent into the hole (such as when contacting water or watery liquid down the hole). A standard cable can flex the same amount in any transverse direction of the cable, whereas the tape has reduced tendency to flex transversely in a width direction of the tape compared to a direction through the thickness of the tape. Therefore, the tape has reduced risk of loping past the tool and reduces the risk of incorrect measurement.

A heater may be provided to warm the tape, such as by direct heating of the tape or by heating a component of the winch, such as a heated cover/housing, spool and/or axle/axis of the spool.

The heater may warm the tape as the tape is payed-out and/or retracted to the spool. For example, the heater may heat the tape as the tape leaves/returns onto the spool. The heater may include a heat lamp/light, such as an infra-red light source or may include a heater element (such as at least one an electric inductive or resistance element). Heating the tape in cold environments can reduce the risk of one or more of ice between the spooled coils of the tape on the spool, inaccurate distance measurements, deterioration of the tape, variations in thermal effects on the tape, changes in effective length of the tape etc.

DESCRIPTION OF PREFERRED EMBODIMENT(S)

Figure 1:
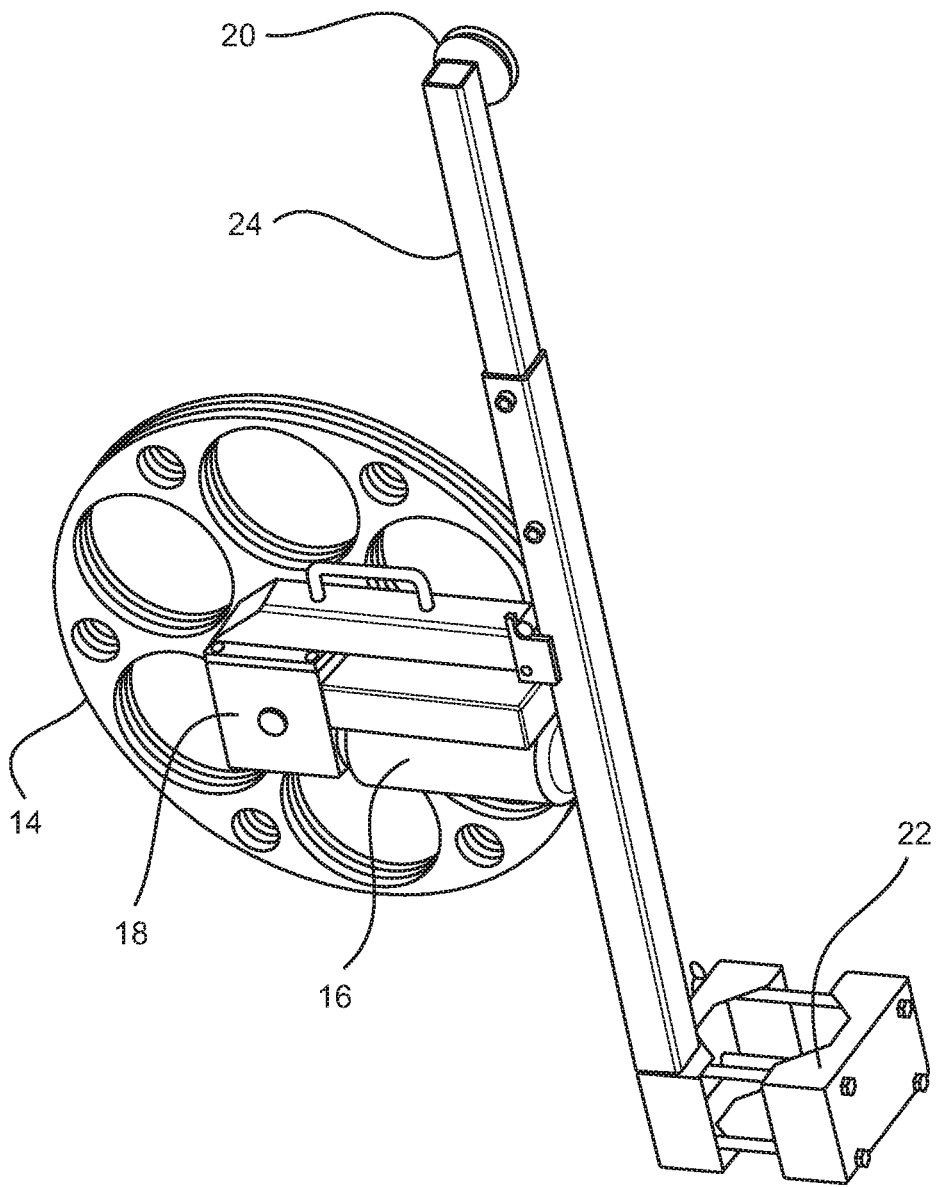
FIG. 1 shows a view of a device for deploying a tape from a narrow spool, such as for use as a winch, according to an embodiment of the present invention.
Figure 2:
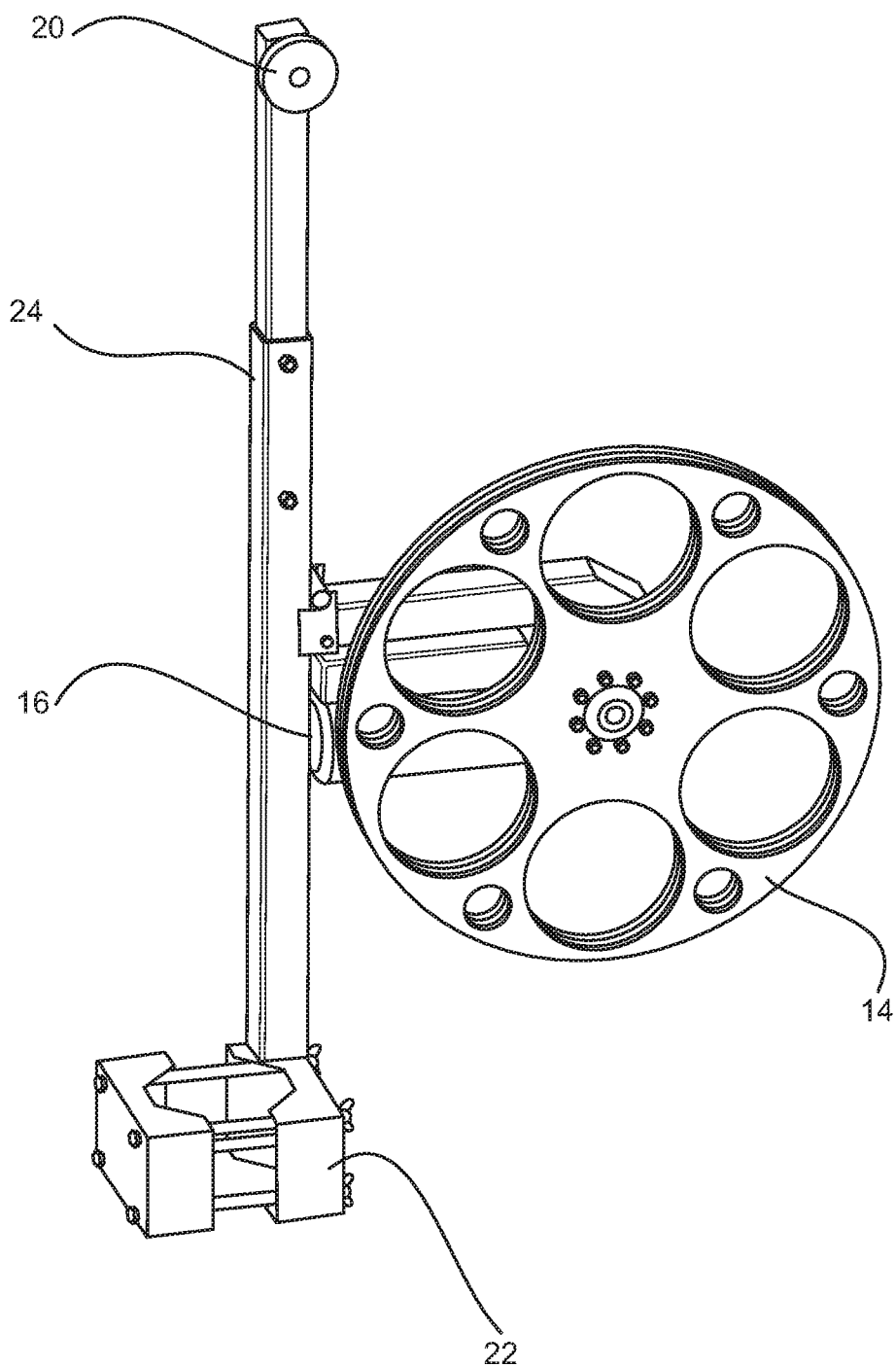
FIG. 2 shows an alternative view of the device of FIG. 1.
Figure 3:
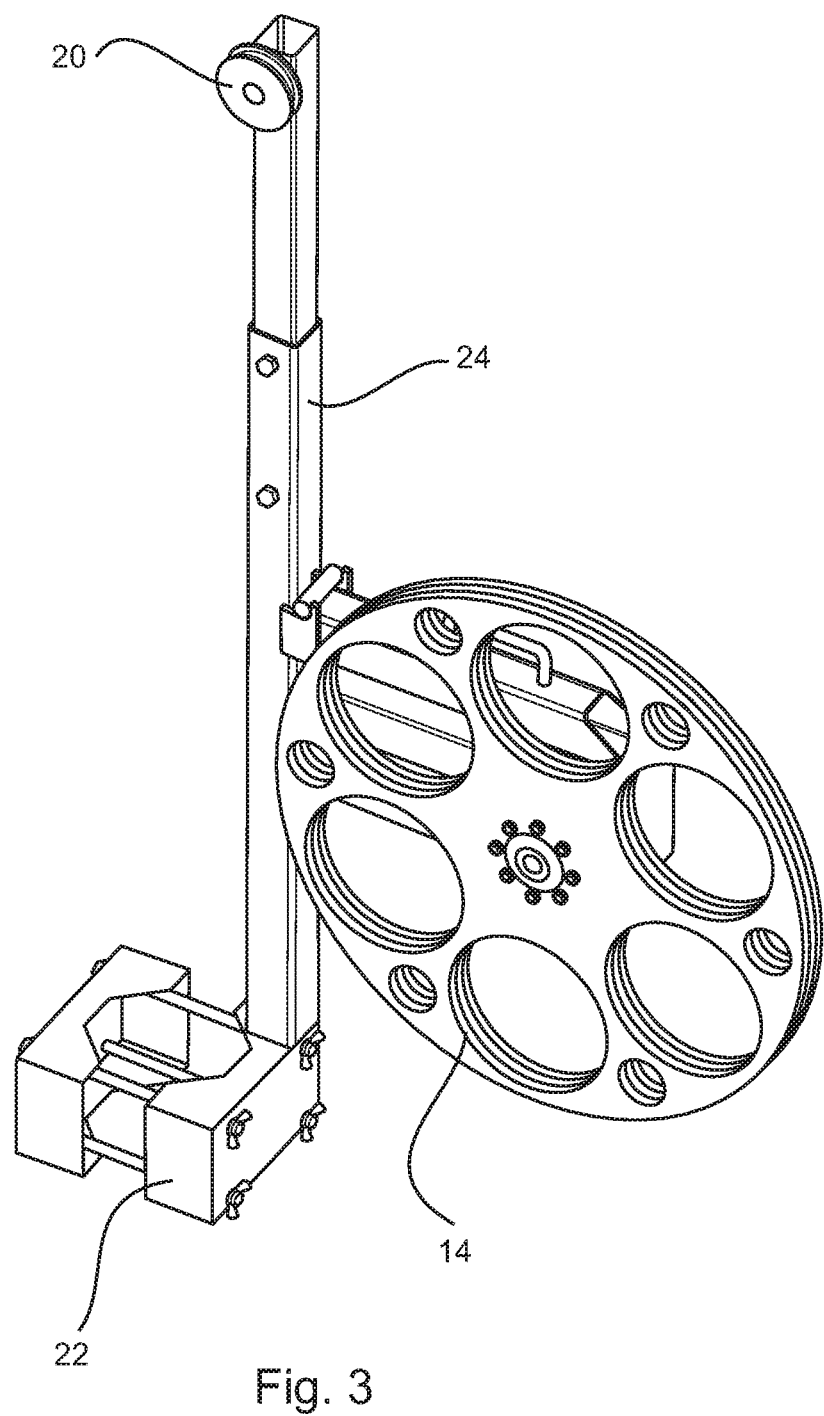
FIG. 3 shows an alternative view of the device shown in FIGS. 1 and 2.

FIGS. 1 to 3 show alternative views of apparatus including a device 10 for deploying a tape 12 spirally wound on a narrow spool 14.

The device 10 has a motor 16 driving a drive mechanism 18 to rotate the spool about a central axis.

A guide wheel 20 guides the tape during deployment and retraction.

It will be appreciated that the tape is wound and unwound as a single narrow spiral from and onto the spool.

The device includes a clamp 22 to clamp the device onto a vehicle (not shown).

The device can include a support frame 24, which can include adjustment to vary the distance the guide wheel 20 is spaced from the spool.

The spool with the wound tape, the motor and/or the drive mechanism can be enclosed for safety within a housing, such as a fiberglass, metal or polymer housing.

Various spool diameters and widths can be used to suit the width and thickness of the tape. However, the tape is wound onto and from itself in a single spiral, making the spool lighter and avoiding the need for a side to side spooling guide.

Figure 4:
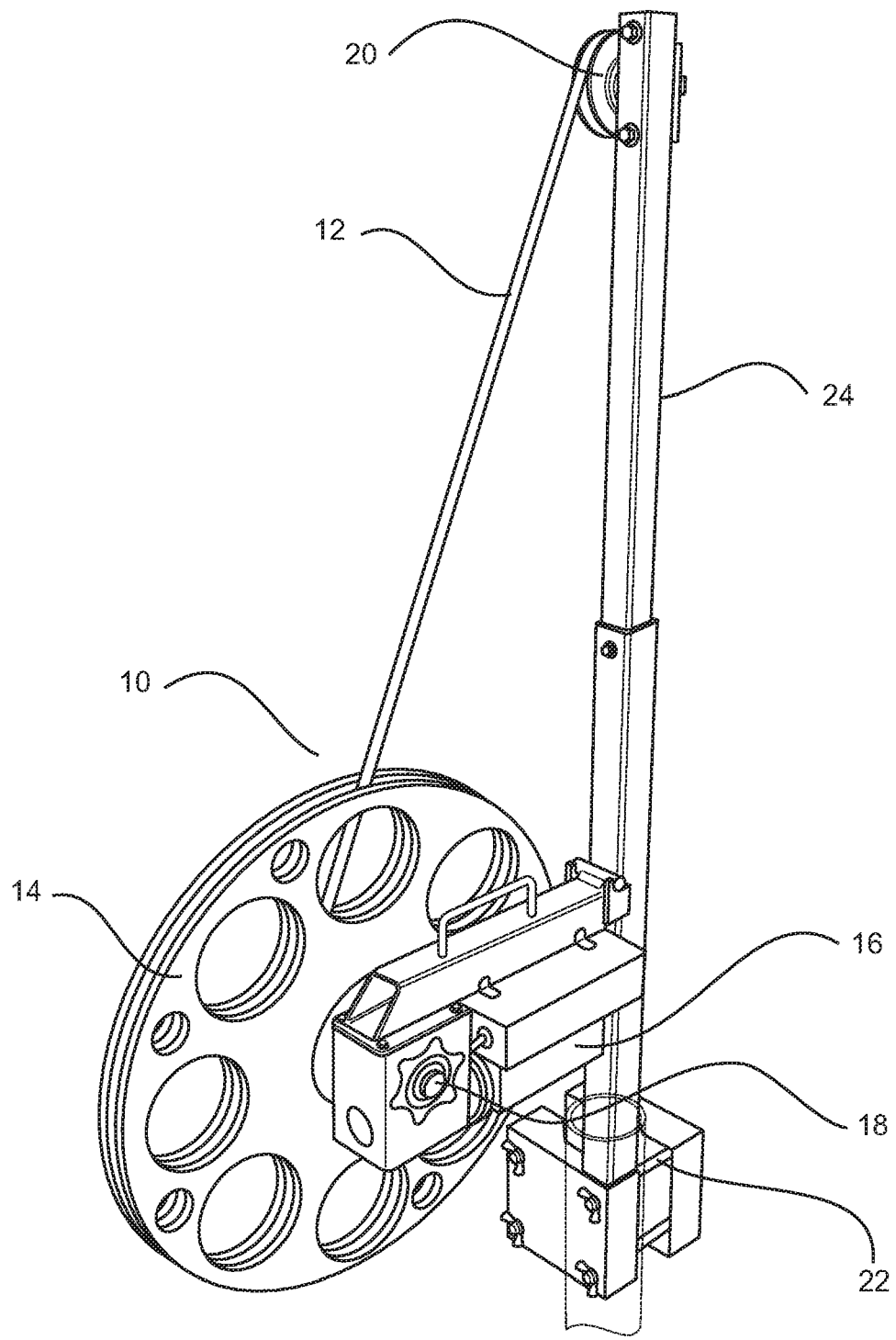
FIG. 4 shows a device according to an embodiment of the present invention.

As shown in FIG. 4, the spool holds a 900 m tape.

It will be appreciated that no calibration is necessary and there is no need to spool side to side to create a lateral layer of a round section cable before another layer can be created.

Figure 5:
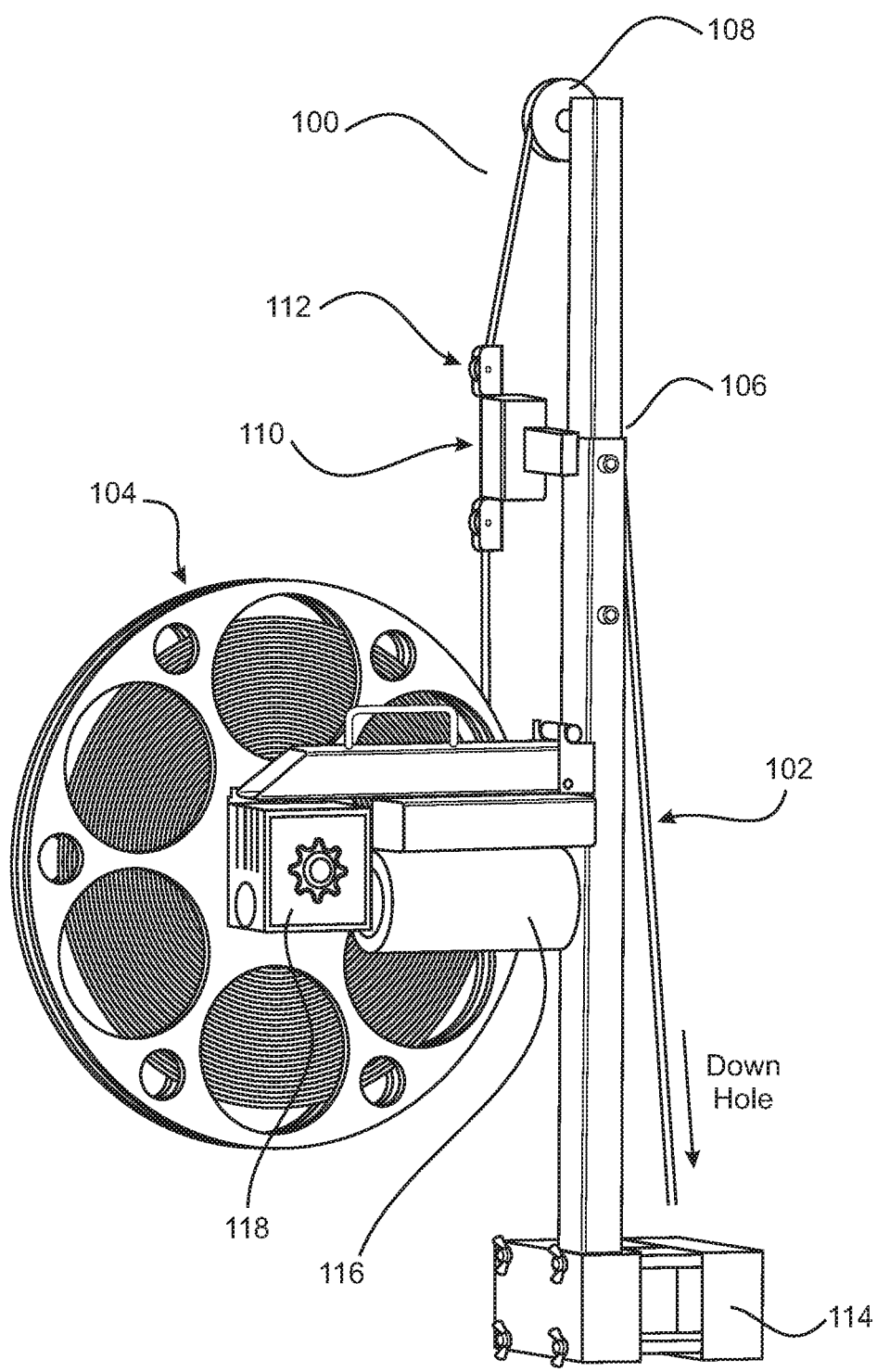
FIG. 5 shows a device for paying out and/or retrieving a tape from/to a spool and including a distance determining device according to an alternative embodiment of the present invention.

FIG. 5 shows an alternative embodiment of the present invention.

An apparatus according to at least one embodiment of the present invention includes a device 100 includes a tape 102 for paying out and rewinding back onto a spool 104.

The spool is supported by a support 106 and the tape is guided by a guide or idler pulley/wheel 108.

The tape includes a number of spaced indicators which are detected as each indicator passes a reader 108.

The reader identifies how many indicators have been detected and/or rate of detection of the indicators to provide an indication of distance and/or rate of paying out and/or retraction of the tape and therefore provide an indication of the distance and/or rate of paying out or return of an object to which the tape is attached or a particular point on the tape, such as a leading end portion.

At least one guide and wiper arrangement 112 is provided to ensure correct deployment/return of the tape and to clean the tape, particularly during rewind when the deployed tape may have become dirty and/or wet.

The support includes a mount 114, and rotation of the spool is powered by a motor 116 driving through gearing 118 to the axis of the spool.

Figure 6:
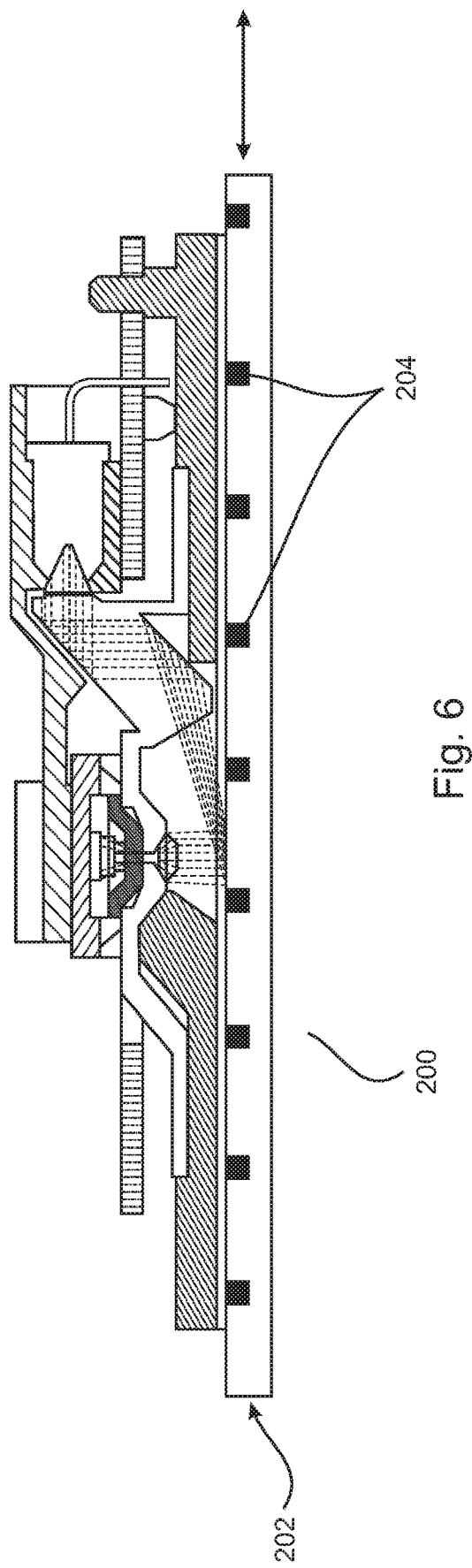
FIG. 6 shows an example of a detector for detecting and/or reading indicators in or on the tape, according to an embodiment of the present invention.

FIG. 6 shows an example of a detector 200 used for detecting the spaced indicators or markers 204 on the tape 202. The detector can be or from part of the reader 112 mentioned above.

Figure 7:
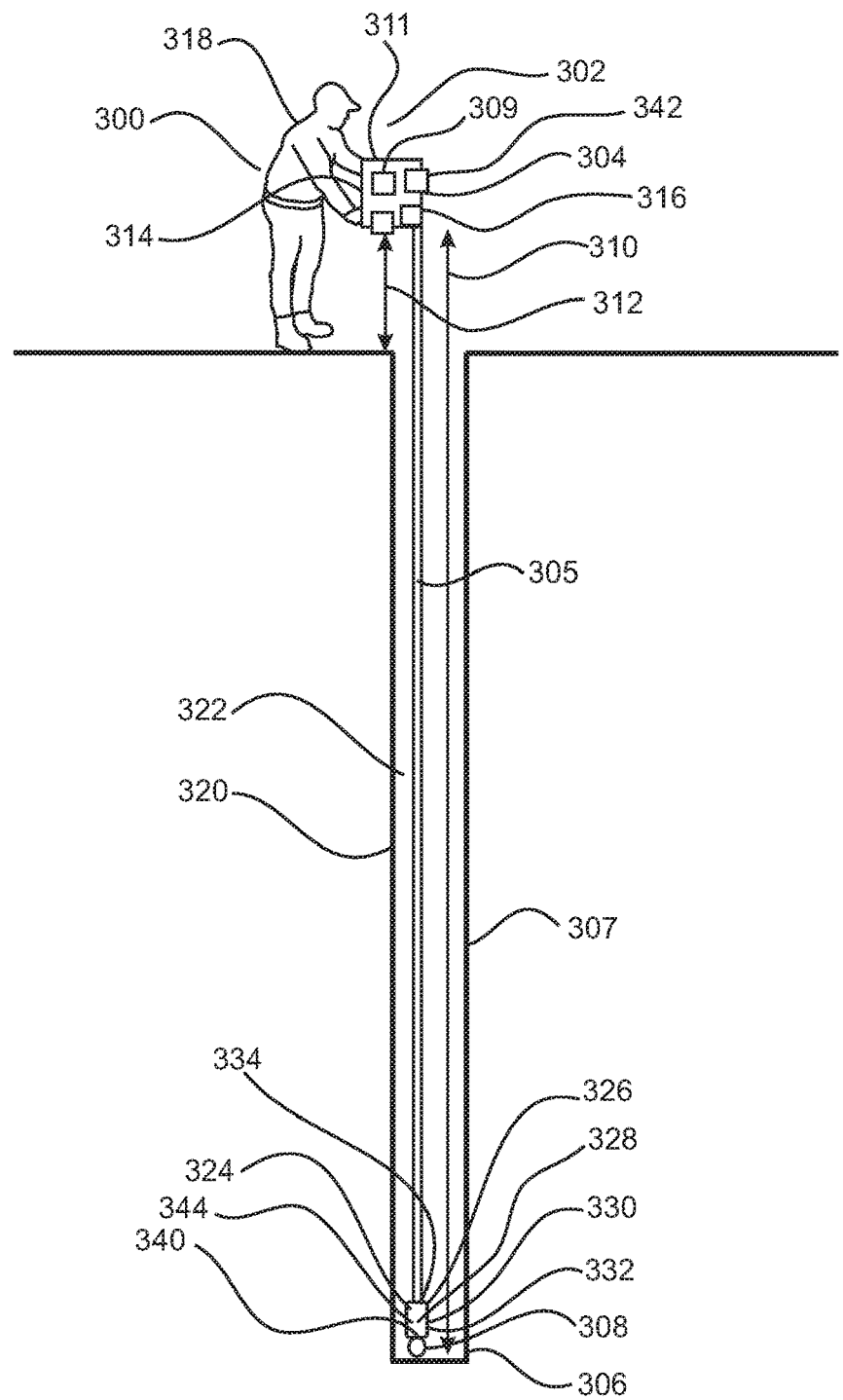
FIG. 7 shows an alternative embodiment of the present invention.

As shown by way of example in FIG. 7 of an embodiment 300 of the present invention, a user 302 employs an apparatus including a tape winch device 304 that pays out a tape 305 (preferably weighted by a weight 308) into a bore hole or blast hole 307.

The weight reaches the bottom 306 of the hole 307. The device can detect that the weight has reached the bottom and stops paying out the tape.

Speed control and snag detection can be provided. The apparatus can detect when the weight or tool at the end of the tape has snagged as it advances down the hole and tension and/or speed of the tape advancing changes. Such detection can be by detecting tension in the tape slackening or torque at the motor of the winch changing. The winch can include torque sensing and/or speed sensing means to determine whether the tape is paying-out and/or returning correctly.

The device can determine the depth of the hole by subtracting a sensed height 310 of the device above ground surface 311 from the total depth 312 measured.

The device 310 can include a height above ground sensor 314 and a tape distance measurement device 316, such as an optical or magnetic sensing device.

The tape can include spaced markers along the length of the tape, which may be apertures in the tape or physically marked or embedded markers on or in the material of the tape, as previously described.

The user can hold the device as a handheld device or the device may be supported on a belt, harness or strap 318 supported on the user 302.

Pressure, temperature and/or presence of water can be sensed by at least one respective depth sensor 326, pressure sensor 328, temperature sensor 330 or moisture sensor 334, which can be provided on the weight, attached to the weight or attached to the end of the tape in the drill or blast hole.

Water 322 depth of water or watery mud or muddy water 320 can be sensed, such as by a pressure sensor 326 on the weight or in the sensor device at or near the leading end of the tape.

A sensor device 324 can be attached to or be part of the tape 305 of a tape winch 304.

The sensor device 324 can be provided toward or at the leading (free) end of the tape to be payed out in use.

The sensor device can incorporate one or more of depth 326 and/or pressure 328 and/or temperature sensors 330, and may include an on-board power supply, such as a battery 332.

The tape winch may include a verticality/angle sensor 342 to provide an indication of whether the bore hole, drill hole or blast hole is vertical or off from vertical and what angle from vertical the hole is.

The tape winch may include communication with a sensor 344 in a sensor device downhole on the tape, which communicates via wires, fibre optics or through a conductive said tape, the communication establishing any vertical offset between the downhole sensor (such as being at the bottom of the hole) and the tape winch at the surface, to provide an indication of any deviation of the hole from vertical.

The sensor device can be electrically or optically connected along a length of the tape to a winch device, such as by wires or fibre optics 336 embedded in or applied to a surface of the tape 305.

The tape winch device 304 may include a heater 309 to warm the tape. The heater may heat the spool which then warms the tape and/or the heater may directly warm the tape, such as by passing the tape past the heater as the tape deploys from the spool and/or retracts onto the spool. The heater may be provided by or on a housing/cover 313 for at least the spool.

Figure 8:
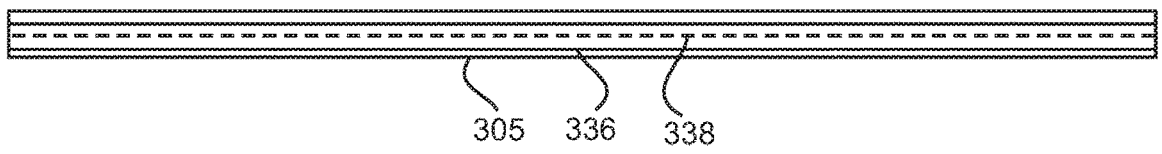
FIG. 8 provides an example of a tape according to an embodiment of the present invention.

As exemplified in FIG. 8, the tape can include wires or fibre optics 336 embedded in or applied to a surface of the tape 305 and/or apertures or embedded or surface applied markers/indicators 338 along a length thereof for reading by the optical or magnetic sensor at the winch.

Alternatively, the tape may be conductive to electricity and signals may be sent or pulsed along the material of the tape instead of using electrical conductors or fibre optics.

A method of obtaining downhole data involves paying out a sensor device at or near a leading end of a tape of a tape winch, obtaining data relating to one or more parameters, retrieving the sensor device by paying in the tape.

The method can include the sensor device measuring pressure, sensing immersion in water or a predetermined temperature whilst deployed.

The sensor device can be or provide a weight for the end of the tape or is attached or otherwise connected to a weight for the end of the tape.

When a bottom of the hole or other depth is reached, hole depth or accelerometer 340 measuring that the tape is not moving downwards triggers a recording or sensing event.

After recording depth and any other desired parameter is achieved, the winch pulls up the sensor device.

At the surface, the depth and any other recorded data is compared with depth/distance from optical/magnetic sensor for the tape at the winch device at the surface.

Modifications and variations to the sampling system described above may be apparent to the skilled reader of this disclosure. Such modifications and variations are deemed within the scope of the present disclosure.

The invention claimed is:

1. A winch apparatus including;
   a load bearing member in the form of a lightweight flexible elongate tape of flat or curved in cross section, the tape being thinner in cross section than the width;
   a spool onto which the load bearing member is wound in and from which the load bearing member is payed out;
   a sensing system for monitoring length or distance the load bearing member of the winch is payed out or wound in;
   the load bearing member including a weight attached to or forming part of the tape toward or at the leading (free) end of the tape to be payed out in use; and
   at least one sensor device at or adjacent the weight or the leading end of the lightweight flexible elongate tape, wherein the sensor device includes any one or more of a pressure sensor, accelerometer, temperature sensor, and water sensor.

2. The winch apparatus of claim 1, wherein the spool is configured such that the tape deploys from a single spiral wound continuous layer.

3. The winch apparatus of to claim 1, the lightweight flexible elongate tape having a structure of strands orientated in multi directions.

4. The winch apparatus of claim 3, wherein the multi directions include a combination of two or more of longitudinal strands, transverse strands, diagonal strands, filaments or ribbons of material.

5. The winch apparatus of claim 4, wherein the longitudinal strands, transverse strands, diagonal strands, filaments or ribbons, or combinations of two or more thereof, are bonded or fused together.

6. The winch apparatus of claim 5, wherein the longitudinal strands, transverse strands, diagonal strands, filaments or ribbons are bonded in a plastics material, bonded in an adhesive material or are heat sealed together, or combinations of two or more thereof.

7. The winch apparatus of claim 1, wherein the lightweight flexible elongate tape includes metal strands or wires.

8. The winch apparatus of claim 1, wherein the lightweight flexible elongate tape includes a number of indicators or markers disposed at spaced intervals along at least part of a length of the lightweight flexible elongate tape.

9. The winch apparatus of claim 1, wherein the lightweight flexible elongate tape includes a number of indicators or markers disposed at spaced intervals along at least part of a length of the lightweight flexible elongate tape, and wherein the indicators or markers are applied onto or into the material of the lightweight flexible elongate tape or are provided by holes or recesses in the lightweight flexible elongate tape, or by transparency or thinning of the lightweight flexible elongate tape.

10. The winch apparatus of claim 1,
wherein the lightweight flexible elongate tape includes a number of indicators or markers disposed at spaced intervals along at least part of a length of the lightweight flexible elongate tape, and
wherein the indicators or markers include metallic or electrically conductive indicators which are any one or more of:
within the lightweight flexible elongate tape,
embedded in the lightweight flexible elongate tape, and
applied to the lightweight flexible elongate tape.

11. The winch apparatus of claim 1,
wherein the sensing system includes means for sensing at least one of presence and position of spaced indicators provided on the load bearing member, and includes magnetic or electromagnetic sensing of the indicators.

12. The winch apparatus of claim 11, wherein the load bearing member is opaque or semi-opaque to optical light or to electromagnetic radiation or is not significantly influencing of a magnetic field.

13. The winch apparatus of claim 1, including means to illuminate the lightweight flexible elongate tape with electromagnetic radiation.

14. The winch apparatus of claim 13, wherein the lightweight flexible elongate tape includes one or more holes through which the electromagnetic radiation passes.

15. The winch apparatus of claim 1, including a verticality sensor to measure angle of the hole into which the load bearing member is advanced.

16. The winch apparatus of claim 1, including at least one sensor that senses slack in the lightweight flexible elongate tape or reduction in weight acting on the lightweight flexible elongate tape.

17. The winch apparatus of claim 1,
including a wiper arrangement to wipe the surface of the lightweight flexible elongate tape.

18. The winch apparatus of claim 1 wherein the lightweight flexible elongate tape includes metallic or electrically conductive indicators any one or more of:
within the lightweight flexible elongate tape,
embedded in the lightweight flexible elongate tape, and
applied to the lightweight flexible elongate tape.

19. The winch apparatus of claim 1,
including a heater to heat the lightweight flexible elongate tape directly or indirectly.

20. The winch apparatus of claim 19, wherein any one or more of the spool and a housing for the spool is heated by the heater.

21. A winch apparatus including;
a load bearing member in the form of a lightweight flexible elongate tape of flat or curved in cross section, the tape being thinner in cross section than the width;
a spool onto which the load bearing member is wound in and from which the load bearing member is payed out;
a sensing system for monitoring length or distance the load bearing member of the winch is payed out or wound in;
the load bearing member including a weight attached to or forming part of the tape toward or at the leading (free) end of the tape to be payed out in use; and
including at least one height sensor to determine the height of the spool from ground surface to subtract the determined height from the ground surface from a length of the lightweight flexible elongate tape payed out to determine true hole depth measurement.

22. The winch apparatus of claim 21, wherein length of the lightweight flexible elongate tape deployed over a measured period of time is used to determine rate of advancement of the tape.

23. The winch apparatus of claim 21, wherein the sensing system includes a rotary encoder having an encoder disc rotationally connected to a shaft in contact with the lightweight flexible elongate tape, such that, as the lightweight flexible elongate tape pays out, the rotary encoder disc rotates and provides an angular measure of the length of extent of the lightweight flexible elongate tape, this correlating with the distance the weight has advanced.

24. A drilling rate of penetration measurement system for a drilling operation, the system including a winch apparatus including; a load bearing member in the form of a lightweight flexible elongate tape of flat or curved in cross section, the tape being thinner in cross section than the width; a spool onto which the load bearing member is wound in and from which the load bearing member is payed out; and a sensing system for monitoring length or distance the load bearing member of the winch is payed out or wound in; the load bearing member including a weight attached to or forming part of the tape toward or at the leading (free) end of the tape to be payed out in use, and wherein the sensing system is arranged to provide an indication of distance a drill bit or part of a drill rig or other tool advances during drilling, wherein the lightweight flexible elongate tape is a flat tape that unwinds from being spirally wound around the spool to an extended orientation during such advancement, and rewinds into a spiral of the flat tape during a return action, the spiral being in a single plane.

25. The system of claim 24, wherein length of the tape deployed over a measured period of time is used to determine rate of advancement of the lightweight flexible elongate tape.

26. The system of claim 25, wherein a leading or free end of the lightweight flexible elongate tape is connected to a moveable portion of a drillstring drive assembly associated with the drilling mast.

27. The system of claim 26 wherein the sensing system includes a rotary encoder having an encoder disc rotationally connected to a shaft in contact with the lightweight flexible elongate tape, such that, as the lightweight flexible elongate tape pays out, the rotary encoder disc rotates and provides an angular measure of the length of extent of the lightweight flexible elongate tape, this correlating with the distance the movable portion of drill string drive assembly has advanced, and therefore a measure of the distance the drill bit has advanced.

28. The system of claim 24, including a wiper arrangement to wipe the surface of the lightweight flexible elongate tape.

* * * * *